Patented Nov. 18, 1952

2,618,244

UNITED STATES PATENT OFFICE 2,618,244

PILOT VALVE CONTROLLED TRACER VALVE

Erwin G. Roehm, Norwood, Ohio, assignor to The Cincinnati Milling Machine Co., Cincinnati, Ohio, a corporation of Ohio Application March 12, 1947, Serial No. 734,096

1 Claim. (Cl. 121—46.5)

This invention relates to automatic pattern controlled mechanisms and more particularly to improvements in tracer mechanisms therefor.

One of the objects of this invention is to reduce or lighten the contact pressure on a pattern by a tracer finger by making the determination of the amount of this pressure independent of the weight of the parts connected to the tracer finger so that this pressure may be made less than the weight of the operating parts connected to the tracer finger.

Another object of this invention is to improve the accuracy of duplication in pattern controlled machine tools.

A further object of this invention is to provide an improved power amplifying means between the tracer finger and its controlled power controlling device and thus reduce the weight and inertia of the operating parts connected to the tracer finger.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claim, without departing from or exceeding the spirit of the invention.

Referring to the drawings in which like reference numerals indicate like or similar parts:

Figure 1:
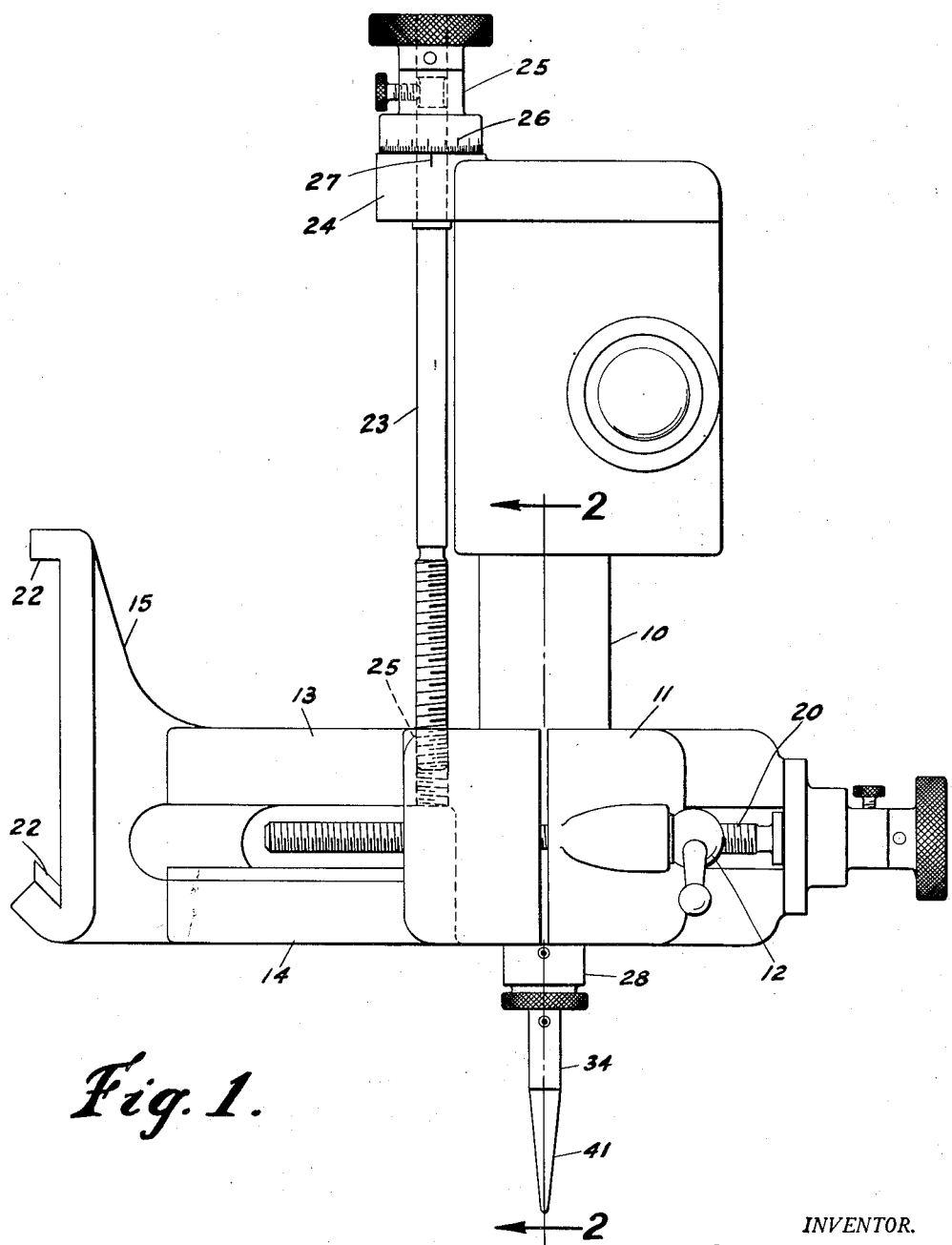
Figure 1 is a view in elevation showing the general assembly and mounting of the tracer mechanism embodying the principles of this invention.

Referring to the drawings and more particularly to Figure 1, the reference numeral 10 indicates the main body or housing of the tracer mechanism which may be suitably clamped in a split carrier member 11 by a clamping screw, indicated generally by the reference numeral 12. The carrier member 11 may be mounted for longitudinal adjustment along the faces 13 and 14 of a bracket 15, and guided relative thereto by a guide portion 16, Figure 2, formed integral with the carrier 11, which is mounted between the guiding face 17 of the bracket 15 on one side and a gib member 18 on the other side. A clamping screw indicated generally by the reference numeral 19 is threaded into the guide portion 16 for tightening the bracket against the guide faces 13 and 14. By loosening the screw 19, an adjusting screw 20, which is fixed against axial movement in the bracket 15 and threaded into the guide portion 16 of the bracket, may be rotated to effect longitudinal adjustment of the carrier 11.

The bracket 15 may be provided with suitable guide surfaces 22 whereby the parts may be secured to a suitable tool carrying slide of a pattern controlled machine tool, the movement of which slide is to be controlled by the tracer.

The housing 10 may be vertically adjusted relative to its carrier 11, which is often necessary, to properly position the tracer relative to its pattern without disturbing the position of the cooperating cutter or tool with respect to a work piece. This adjustment is accomplished by means of an adjusting screw 23 which is mounted in a bracket 24, formed integral with the housing 10, against axial movement and is threaded at 25 in the carrier 11. The adjusting screw 23 is provided with a suitable control knob 25 which carries suitable graduation marks 26 for cooperating with a fixed reference mark 27 formed on the bracket 24. These graduations may be in the nature of a micrometer mechanism for accurately positioning the tracer.

Figure 2:
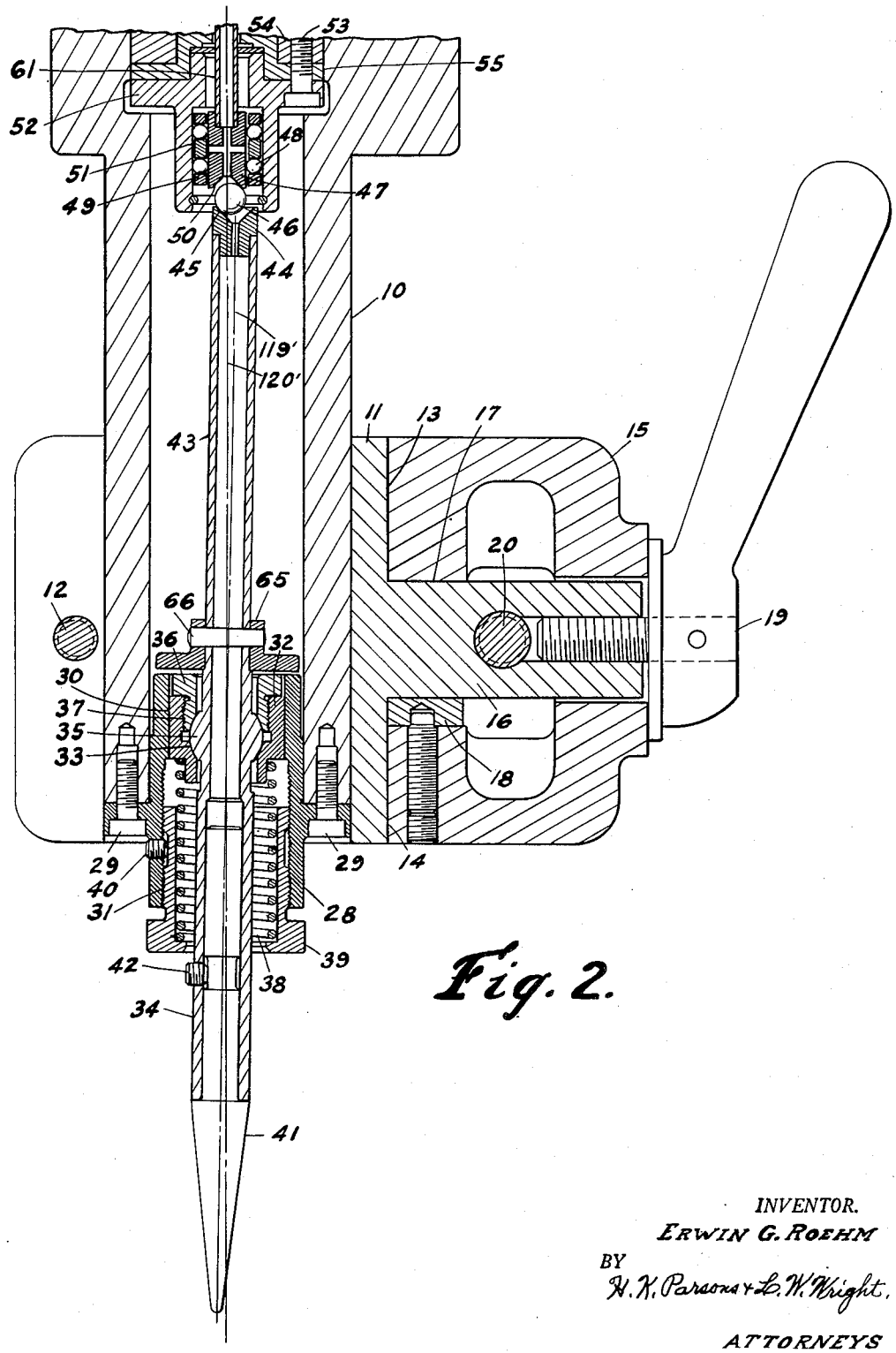
Figure 2 is an enlarged sectional view on the line 2—2 in Figure 1.

Referring to Figure 2 of the drawings, it will be seen that the housing 10 is in the form of a hollow tubular member having a flanged tubular member 28 inserted in the end thereof and secured thereto by suitable means such as bolts 29. The upper end of the member 28 is provided with a finished bore 30 and the remaining portion is provided with an internal thread 31. A tracer sleeve carrier 32 is mounted for sliding movement in the bore 30 and is provided with a semi-spherical seat 33. The tracer sleeve 34 is provided with an enlarged spherical portion 35, the lower part of which rests on the seat 33 and the upper part of which is engaged by a clamping member 36 which is threaded at 37 in the carrier 32. The member 36 is adjusted relative to the part 32 to prevent any lifting movement of the sleeve 34 relative to its seat 33 but at the same time to permit universal oscillation of the sleeve 34 about the center of its spherical portion 35.

The member 32 is held for sliding movement within the bore 30 by means of a spring 38 which is mounted within a spring retaining cup 39 which is adjustable on the threads 31 of the member 28. When the member 39 is properly adjusted, it is locked by a set screw 40 which is threaded radially into the member 28. Attention is invited to the fact that the spring 38 is very accurately made and it constitutes the sole supporting means for the tracer sleeve and the parts connected thereto as will be brought out as the description proceeds.

Figure 3:
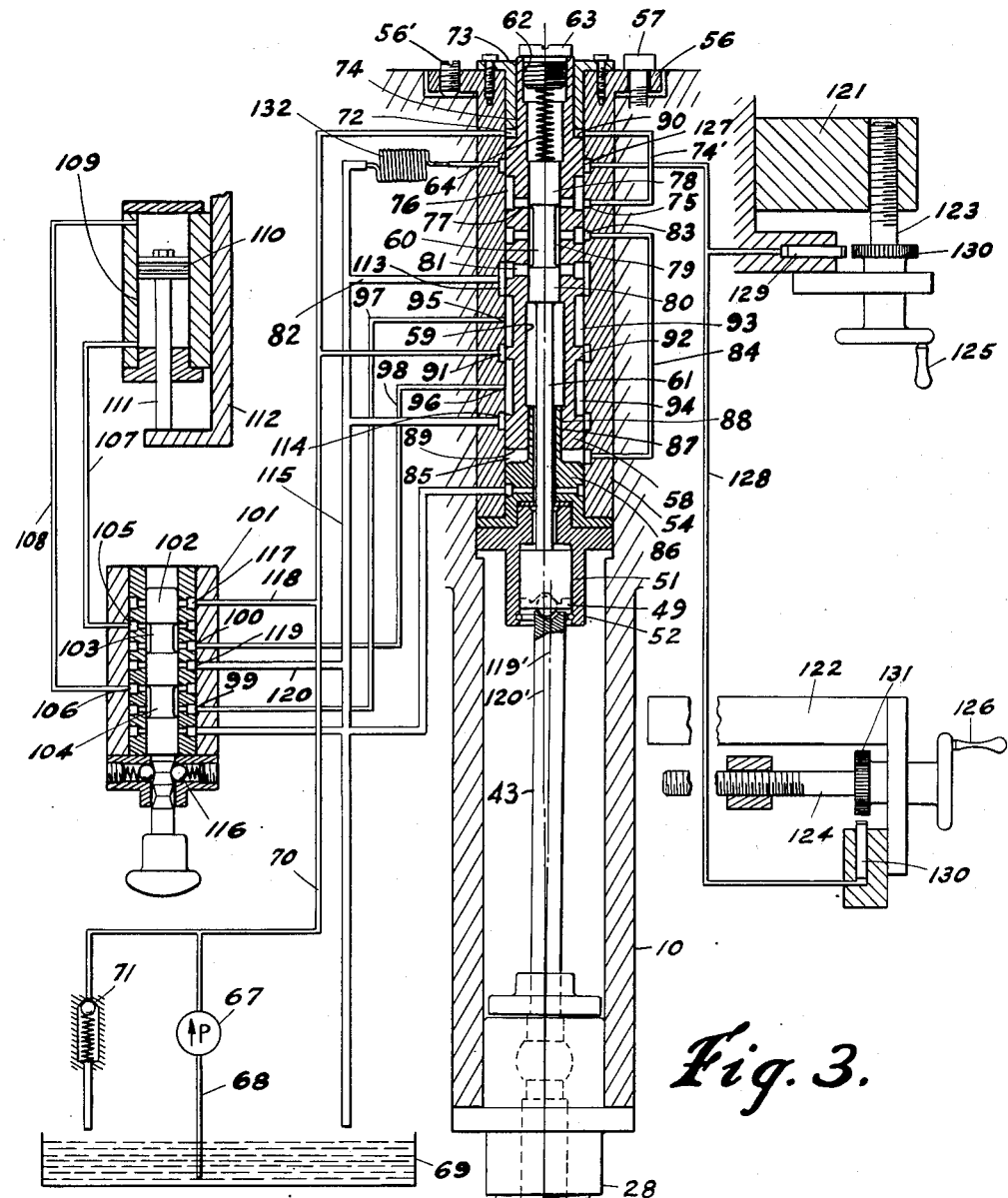
Figure 3 is a diagrammatic view of the hydraulic control circuit.

A suitably formed tracer finger 41 is secured in the end of the tracer sleeve as by a set screw 42. The end of this tracer finger is adapted to engage a suitable pattern indicated by the reference numeral 43' as shown in Figure 3.

The tracer sleeve has a long tubular extension 43 formed on the upper side of the spherical portion 35 relative to the tracer finger supporting portion, and is of somewhat the same length as that portion for balancing and operating purposes. In the end of the tubular portion 43 is a plug 44 which has a conical seat 45 formed in the end thereof for receiving a ball 46.

This ball is interposed between the member 44 and a member 47 which is confined for axial sliding movement by anti-friction members in the form of balls 48 which are mounted in a sleeve or retainer 49. The member 47 has a concave depression 50 formed in the end thereof for receiving the ball 46 and the arrangement is such that lateral movement of the member 43 will be transformed by the ball 46 into axial movement of the member 47.

The retainer sleeve 49 is mounted in a socket 51 formed in the end of a flanged member 52 which is secured by bolts 53 to the end of a valve sleeve 54. This valve sleeve is mounted in a bore 55 formed in the housing 10 and is provided with a flange 56 on the upper end through which bolts 57 are passed to secure the sleeve to the housing.

Mounted within the sleeve 54 is a slidable valve member 58, as shown in Figure 3, and this valve member has a bore 59 in which is slidably mounted a pilot valve member 60. A spacer rod 61 is interposed between the end of the valve member 60 and the slidable member 47 whereby oscillation of the tracer sleeve 43 will impart axial movement to the pilot valve member 60. The main control valve member 58 has a counterbore 62 in the upper end, which is threaded to receive an adjustable plug 63, which has a light spring 64 interposed between it and the end of the pilot valve plunger 60 for exerting sufficient force to overcome the friction between the member 60 and its bore.

Assuming for the moment that the spring 64 is not under any compression it will now be seen that the lower spring 38 supports all of these moving parts; 32 and 36 which form a retainer for oscillation of the tracer sleeve, the tracer sleeve 34 and tracer finger 41, the ball 46, the slidable member 47, the spacer 61 and the valve member 60. The weight of all these parts will effect a definite amount of compression or shortening of the spring 38.

Since the valve member 60 determines the operation of the parts, it is necessary that this valve have some definite position as a starting point for determining the relative position of the cooperating parts. Therefore, the tracer arm 43 is provided with a flanged member 65, Figure 2, which is secured thereto as by a pin 66, and the spring 38 is so adjusted by rotation of the member 39 that the flange will just come to rest on top of the member 28. The spring 38 is still supporting the weight of all of these parts. The spring 64 located on top of the valve member 60 is now compressed to provide a few ounces of preload upon the member 60 which is sufficient to overcome any sliding friction between the member 60 and the bore in which it slides. This preload will not increase the compression of the spring 38 but will be opposed through the flange member 65 resting on the member 28. It should now be apparent that any pressure or force exerted on the end of the tracer finger 41, such as would be exerted by a pattern must only be sufficient to overcome the resistance of the spring 64 because the full weight of the parts is assumed by the spring 38. It is, of course, recognized that any elongation of the spring 38, which would be caused in this case by upward movement of the tracer, would decrease the upward lifting value of the spring 38 and if this movement were continued until the spring elongated to its free length that its upward lifting value would reduce to zero. However, the upward movement of the tracer valve for complete reversing control is so small that the elongation of the spring is very minute and therefore the decrease in lifting value of the spring is also very small so that for all practical purposes it might be said to be almost the same. However, whatever theoretical difference there is represents the additional force that must be exerted on the tracer in addition to the small force that must be exerted to overcome the resistance of spring 64. It should thus be evident that by this arrangement of the parts that the actuating force on the tracer to cause actuation of the valve mechanism may be reduced to a matter of a few ounces which is many times less than the weight of the parts supported by the spring 38.

The main control valve plunger 58 which is slidably mounted in the sleeve 54 has its position determined by the pilot valve member 60 in the following manner. A source of hydraulic pressure in the form of a pump 67 is provided which has an intake 68 for withdrawing fluid from a reservoir 69 and delivering it under pressure to a line 70. The channel 70 has a branch connection to a relief valve 71 to prevent excessive pressure in the line 70. The channel 70 is connected to a space 72 between the end of the plunger 58 and a sleeve 73 which is inserted in the end of the valve sleeve 54.

It will be noted that the valve plunger 58 has a reduced diameter 74 which is sufficiently long to extend substantially the full length of the sleeve member 73. The pump pressure existing in the space 72 exerts a continuous urge on the valve member 58 in a downward direction as viewed in Figure 3. The space 72 is connected by a channel 74' to a port 75 formed in the sleeve 54, and this port is in constant communication regardless of movement of the valve 58 with a wide annular groove 76 formed in the periphery of the valve 58. Radial ports 77 are formed in the groove 76 and the valve member 60 is provided with a spool 78 to control the flow of fluid through the port 77 and in so doing forms a hydraulic resistance at that port which causes a drop in pressure in the fluid flowing through this port into the annular groove 79 which separates the spool 78 from a second spool 80. The fluid pressure in the annular groove 79 escapes to reservoir through a port 81 and the flow through this port is controlled by the spool 80 which constitutes a second hydraulic resistance causing a drop between the pressure of the fluid in the annular groove 79 and the atmospheric pressure existing in the return channel 82.

Attention is invited to the fact that the length of the annular groove 79 is equivalent to the distance between the center of the port 81 and the center of the port 77 whereby when the parts are in the position shown one-half of the port 77 is closed by the spool 78, and one-half of the port 81 is closed by the spool 80 whereby the resistance to flow of fluid into the space 79 is equal to the resistance to flow of fluid out of that space and in accordance with hydraulic law the pressure in the space 79 would be equal to one-half of the incoming pump pressure.

A third port 83 is interposed midway between the port 77 and 81 to which a channel 84 is connected for conducting the fluid pressure that exists in the space 79 to the space 85 located between the lower end of the valve plunger and a plugging member 86 inserted in the end of the bore of sleeve 54. It will now be obvious that the pressure existing in the space 85 will be equal to one-half of the pump pressure. This pressure will exert an upward urge on the member 58.

The plugging member 86 has a reduced diameter 87 which extends for a substantial length into a bore 88 formed in the valve member 58, thus sealing off the chamber 85. Attention is invited to the fact that the parts are so proportioned that the end area 89 of the valve member 58 which is exposed to the pressure in the chamber 85 is twice the area of the end face 90 of the valve 58 which is exposed to the pressure in chamber 72. It should thus be obvious that the full pump pressure acting on the reduced area 90 which is one-half of the area 89, is equal to the product of one-half of the pump pressure acting on the area 89. Thus, the valve plunger 58 would be held stabilized in a given position as determined by the position of the valve plunger 60, and any deviation from this position due to movement of either one of these valve members relative to the other would change the value of the resistances at the ports 77 and 81 and thereby cause the hydraulic pressure in chamber 85 to increase or decrease and thereby cause a repositioning of the parts in such a manner that the hydraulic resistances can become substantially equal.

The valve sleeve 54 has a pressure port 91 which is branch connected to the channel 70, and the valve 58 is provided with a spool 92 which is of a width equal to the width of the port 91 and movable relative thereto to control the flow of fluid pressure therethrough and direct it into either the annular space 93 or the annular space 94 of the valve plunger. The space 93 is in communication with a port 95, and the space 94 is in communication with a port 96, and channels 97 and 98 extend from these respective ports to ports 99 and 100 of a start and stop selector valve 101. This valve has a plunger 102 in which are formed annular grooves 103 and 104.

When the valve plunger is in the position shown in Figure 3, the port 100 is connected by the annular groove 103 to port 105, and simultaneously port 99 is connected by annular groove 104 to port 106. Channels 107 and 108 extend from ports 105 and 106 to opposite ends of a cylinder 109 which contains a piston 110 that is connected by a piston rod 111 to a slide 112. The slide 112 diagrammatically illustrates the slide which would carry the tool and the tracer mechanism such as bracket 15 whereby the tracer may control the position of a tool with respect to a work piece in accordance with its cooperating pattern.

The valve sleeve 54 is provided with a pair of exhaust ports 113 and 114 which are connected by branch channels to a main return line 115. These ports are so located that upon upward movement of the valve plunger 58, the port 95 is connected to the exhaust port 113 by the annular groove 93 while the pressure port 91 is connected to port 96, and upon downward movement of the valve plunger the port 96 is connected to the exhaust port 114 by the annular groove 94 while the pressure port 91 is connected to the motor port 95. It will thus be seen that the valve plunger 58 is capable of controlling reversible operation of the slide 112.

In setting up the device it will be obvious that since the position of the pilot valve 60 in a vertical plane is determined by the spring 38 and the flanged member 65, and that the position of the valve member 58 is determined by the position of the valve 60, the sleeve 54 must be axially adjustable to position the pressure port 91 above the valve spool when the tracer arm is in undeflected position. This is accomplished by any suitable means such as a set screw 56' threaded in the flange 56.

With respect to the general operation of the device when the tracer is not in use the stop valve plunger 102 is shifted upward from the position shown, in which position it is held by a detent means, indicated generally by the reference numeral 116, and in this position the port 105 is connected by the annular groove 103 to a pressure port 117 which has a branch connecting line 118 to the pump supply line 70. This puts fluid pressure in the lower end of the cylinder 109 and holds the slide 112 in its upward position. To facilitate this the port 106 is connected by valve groove 104 to port 119 which has a branch connection 120 to the return line 115. At this time the tracer sleeve 34 is undeflected and the central axis 119', as indicated in Figure 2, is in line with the axis 120' of the pilot valve 60 whereby the valve 60 is allowed to move down a predetermined amount as determined by the ball 46 and in this position the valve spool 92 is below the port 91 as viewed in Figure 3 and pressure is connected to the channel 97.

Thus, when the stop valve plunger 102 is shifted to a running position, fluid pressure will enter the upper end of cylinder 109 and the slide 112 will move downward to cause engagement of the tracer finger 41 with the pattern 43. This downward movement will cause deflection of the tracer and upward movement of the pilot valve plunger 60 to a sufficient extent to cause upward movement of the main control valve 58 until it reaches a central position, thereby closing the pressure port 91 and holding all the parts in a stabilized or neutral position. Upon relative movement of the pattern relative to the tracer finger 41 the slide 112 will be caused to move up or down in accordance with the shape of the pattern and in accordance with the established practice of pattern controlled machines.

In machines where the work is supported on superimposed cross slides such as diagrammatically indicated by the reference numerals 121 and 122 having screw feed shafts 123 and 124 there is a possibility that the operator in rotating the manual controls 125 and 126 may not be watching the tracer particularly and cause collision of the tracer finger with some object and which, if the movement continued, would break off the tracer finger. It will be obvious that such collision will cause deflection of the tracer and if this movement is excessive it will cause upward movement of the valve plunger 58 sufficiently to connect the pressure groove 76 with a port 127 which has a channel 128 connected thereto and this channel has branch connections to hydraulic interlock plungers 129 and 130. These plungers, when extended, are adapted to engage toothed wheels 130 and 131 attached to the screws 123 and 124, thereby locking the parts against rotation. When the valve returns, the fluid pressure is adapted to leak through the resistance 132 to the return line 115.

There has thus been provided an improved tracer control mechanism which is so constructed and which may be so adjusted that a very light pressure exists between the tracer finger and the pattern, thereby making the device more sensitive to variations in the shape of the pattern and also decreasing wear between the parts.

What is claimed is:

A tracer mechanism comprising a housing having a valve chamber formed therein provided with fluid pressure and exhaust connections, a pair of motor ports and an interlock port, a main valve slidable in said chamber and having means thereon when in a central position to neutralize said motor ports and close said interlock ports, said main valve having a closed passage therein, a pilot valve slidably mounted in said closed passage, said pilot valve having an annular groove formed therein, resistance ports in said main valve at opposite ends of said groove and continuously connected to said pressure and exhaust connections respectively for continuously maintaining fluid flow under an intermediate pressure through said groove, means connecting said pressure connection to one end of said valve chamber containing the smaller end of said valve, means continuously connecting the intermediate pressure in said groove to the other end of said valve chamber, a tracer supported in said housing and operatively connected for moving the pilot valve through an intermediate range of movement to shift said control valve on opposite sides of its central position to alternately connect said motor ports to said pressure and exhaust connections respectively, said interlock port closing means on the control valve being responsive to an extended movement of said control valve caused by the tracer to open said interlock port and connect said pressure connection thereto.

ERWIN G. ROEHM.

REFERENCES CITED

The following references are of record in the file of this patent:

UNITED STATES PATENTS

| Number | Name | Date |
|---|---|---|
| 734,285 | Thomann | July 21, 1903 |
| 929,206 | Gelpke | July 27, 1909 |
| 2,101,712 | Johansen | Dec. 7, 1937 |
| 2,106,684 | Ring et al. | Jan. 25, 1938 |
| 2,154,718 | Bannon | Apr. 18, 1939 |
| 2,237,038 | Moore | Apr. 1, 1941 |
| 2,332,532 | Roehm | Oct. 20, 1943 |
| 2,395,525 | Wilkie | Feb. 26, 1946 |
| 2,412,549 | Yates et al. | Dec. 10, 1946 |
| 2,424,031 | Heer | July 15, 1947 |
| 2,491,551 | Cross | Dec. 20, 1949 |
| 2,511,056 | Wetzel | June 20, 1950 |

FOREIGN PATENTS

| Number | Country | Date |
|---|---|---|
| 550,473 | Germany | May 18, 1932 |